United States Patent Office 2,970,844
Patented Feb. 7, 1961

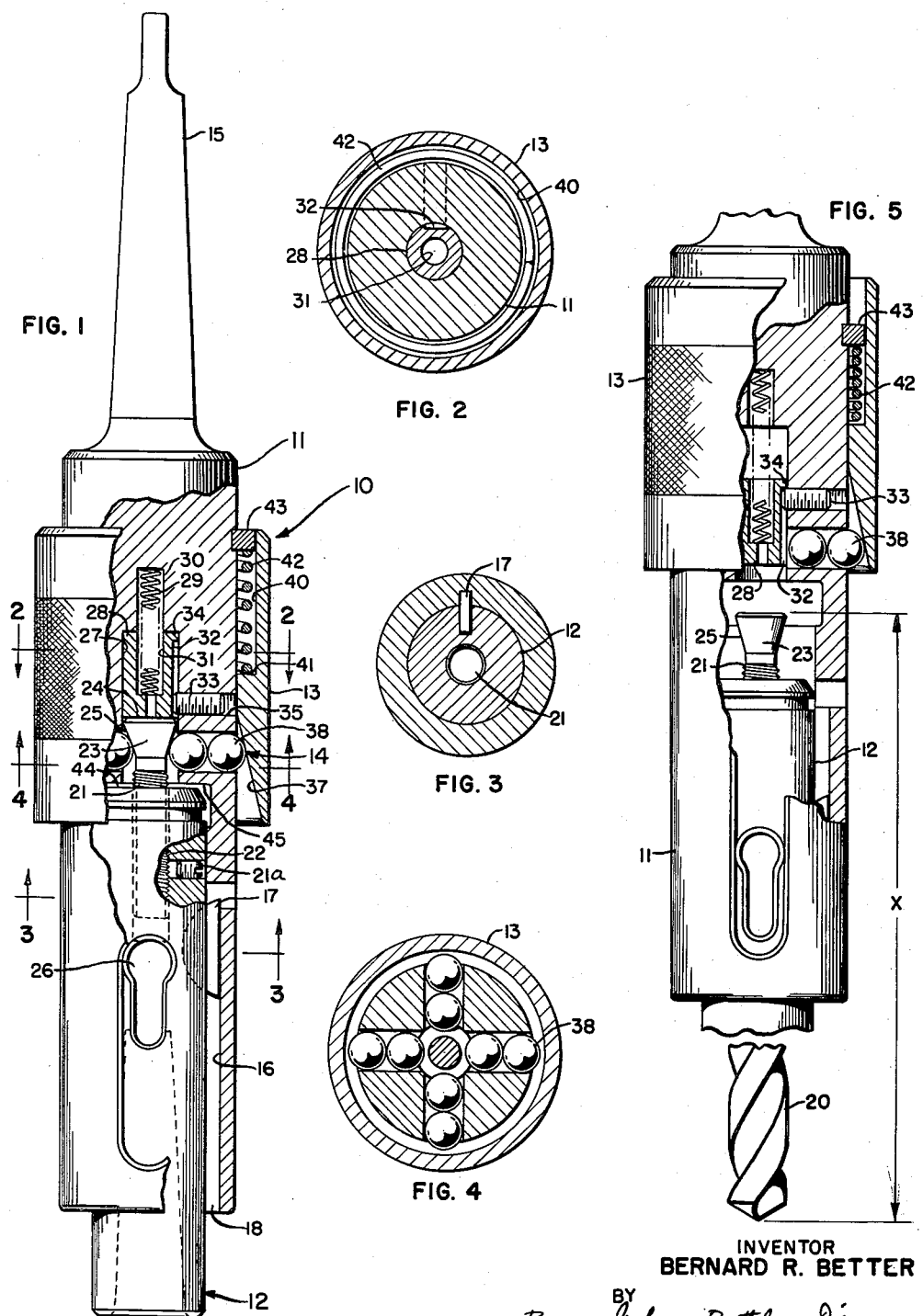

2,970,844

TOOL HOLDER—AXIAL LOCKING TYPE

Bernard R. Better, Chicago, Ill., assignor to Scully-Jones and Company, Chicago, Ill., a corporation of Illinois Filed Feb. 12, 1959, Ser. No. 792,748

10 Claims. (Cl. 279—75)

My present invention relates to chucks and tool holding devices which are particularly adapted for use in multiple spindle machines or machines in which presetting of the tools is desired.

One of the objects of my present invention is to provide a new and improved adjustable tool holding assembly having a spindle, an adjustable adaptor or collet for holding a tool therein which may be preset outside the spindle to any desired setting, and which is greatly simplified in its construction and operation over conventional or prior art type tool holding means.

Still another and important object of my invention is the provision of means in an adjustable tool holding assembly to facilitate the quick removal and insertion of the adjustable adaptor into a spindle of said assembly.

Still another object of my invention is to provide a new and improved adjustable tool holding assembly by which a collet and tool carried thereby may be quickly removed from the assembly and quickly inserted therein; the removal and insertion taking place with only one manual operation.

Still another object of my invention is to provide a means in my adjustable tool holding assembly to eliminate possible back-lash between the spindle and the adjustable adaptor or collet.

I can accomplish the above objects by the provision of a spindle in a tool holding assembly into which an adjustable adaptor or collet may be inserted. The collet has a means which permits the collet and the tool held therein to be preset outside the spindle and which cooperates with locking means in the spindle to lock the collet therein. Means are also provided in the spindle whereby upon manual operation thereof, the collet is released, at which time still another means in the spindle acts to hold the locking means in an unlocked position until the collet is again reinserted in the assembly. In the illustrated embodiment, the means in the collet to permit presetting and to cooperate with the locking means is a screw, the locking means is a plurality of balls actuated by a spring biased cam in an axially manually operable collar and the means to hold the locking means in an unlocked position is an axially movable spring biased retainer.

Other and more particular objects of my invention will be apparent to those skilled in the art from the following description and drawings forming a part hereof and wherein:

Figure 1 is a longitudinal view partially in section, illustrating to advantage the axially manually operable tool holding assembly constructed in accordance with the teachings of my invention with the collet thereof locked in the spindle;

Figure 2 is a cross sectional view taken along line 2—2 of Figure 1 and looking in the direction of the arrows;

Figure 3 is a cross sectional view taken along line 3—3 of Figure 1 and looking in the direction of the arrows;

Figure 4 is a cross sectional view taken along line 4—4 of Figure 1 and looking in the direction of the arrows; and Figure 5 is a longitudinal sectional view of the assembly illustrated in Figure 1 showing the collet thereof in released position and the operation of the means which keep the locking means in the unlocked position until the collet is again reinserted in its specified location.

As shown in these drawings, the illustrated embodiment of my adjustable tool holding assembly is indicated in its entirety as 10 and has a body member or spindle, illustrated in its entirety as 11, an adjustable collet or adaptor assembly, illustrated in its entirety as 12, which is received in a telescoping relationship into the spindle as shown and held therein by an axially movable collar 13 surrounding the spindle and cooperating with and forming part of a locking means, indicated in its entirety as 14 and later to be described.

The spindle 11 is provided with a tapered reduced end portion of the conventional type, as illustrated at 15, whereby the same may be inserted in an automatic machine tool spindle for rotation and operation therewith. The other end of the spindle 11 is cylindrically bored as at 16 to receive the collet and means in the form of a Woodruff key 17 serves to engage a keyway 18 in the spindle to slidably, yet rotatably, mount the collet 12 in the spindle.

As herein previously mentioned, one of the important features of my invention is the improvement in the adjustable adaptor or collet 12 by which a tool such as illustrated at 20 in Figure 5, may be preset in a simple manner within the collet 12 and this preset collet may be quickly locked in, and removed from, the spindle 11. As also mentioned, another important feature of my invention is the reduction in the number of manual operations heretofore necessary to insert and remove the collet from the spindle. Such features will now be described.

In connection with the collet 12, the means for aiding in the presetting of the tool 20 comprises an axially disposed screw 21 secured by a radial locking screw 21a and threadably engaged in a threaded bore 22 in the collet, and which is provided with a head 23 having a flat end surface 24 and a conically shaped or tapered side surface 25. As can be appreciated, the tool 20, when removed from the spindle 11 and sharpened (which shortens the tool) may be adjusted to compensate for the shortening thereof by turning the screw 21 out of the collet so that the surface 24 and the end of the tool may be adjusted or preset to a predetermined standard, as, for example, a distance X illustrated in Figure 5. Continued sharpening and shortening of the tool 20 may be accommodated by the operation of the screw 21, and any removal of the tool 20 for replacement or otherwise may be accomplished by a conventional knock-out slot 26.

In connection with the locking means which cooperates with the collect, the spindle 11 is provided with a cylindrical axial counterbore 27 having a smaller diameter than the bore 16 into which is inserted for sliding movement a ball retainer sleeve 28 actuated by a helical compression spring 29, the latter being received in still another and smaller counterbore 30 and a bore 31 in the ball retainer sleeve. It can be appreciated that when the head 23 of screw 21 is inserted in the counterbore 27 (head 23 being small enough to accomplish such insertion), continued movement thereof will compress the spring 29 to move the retainer sleeve 28 upwardly. When the head 23 is removed, the retainer sleeve, by operation of the spring 29, will tend to move downward. Continued movement of the retainer sleeve out of the bore 27 is prevented by means in the form of a groove 32 into which a set screw 33 radially disposed in the spindle 11 is received to cooperate with a retaining wall 34 as can be appreciated. Set screw 33, working in threaded bore 35, permits disassembly of the retainer sleeve from the spindle, when necessary or desirable.

Turning now in particular to Figure 5, it can be seen that when the ball retaining sleeve 28 is in its extreme lower position, it maintains eight balls, indicated in their entirety as 36, radially disposed in groups of two in the spindle in an outward position, such outward position having been permitted by the movement of the collar 13 upwardly. Collar 13 is provided at its end near the collet with an inward tapered camming surface 37 which cooperates with the balls 38. It is to be noted that the collar 13 and tapered surface 37 are of sufficient axial length to maintain the balls 38 in their radially inward position in contacting relationship with the tapered surface 25 on the collet screw head 23 as illustrated in Figure 1, to lock the collet 12 within the spindle and to maintain the balls 38 within the spindle without the danger of the latter coming out of the spindle when in unlocked position. As also seen in Figures 1 and 5, the collar 13 is counterbored at its other end opposite from the tapered portion 37, as illustrated at 40, so that the end wall 41 thereof cooperates with a compression spring 42. Spring 42, with its retainer ring 43, fixedly mounted in the spindle 11, serves to urge the collar 13 downwardly or toward its locked position.

From the above description, it can be seen that when a collet 12 is to be reinserted in the spindle 11, the head 23 thereof will serve to urge the ball retaining sleeve 28 inward of its bore so that the balls 38, being cam actuated by the camming surface 37 of collar 13, rigidly maintain the head 23 in place with the conical or tapered surface 25 holding the collet in position. In this position, the end 44 of the collet 12 is spaced from a radially extending end wall 45 in the spindle and with the cooperation between the tapered wall 25, balls 38, and camming surface 37, which make the head 23 and sleeve 28 act as a unit, the collet 12 is rigidly locked therein, preventing any back-lash.

In order to remove the collet 12 and tool 20 from the spindle, it is simply necessary to pull the collar 13 upwardly as shown in the drawing, compressing the spring 42 whereby the camming function of surface 37 is released freeing the balls 38, thus permitting the head 23 to be withdrawn. At that instant, the retaining sleeve 28 follows the head 23 the distance permitted by the set screw 33 so that the balls 38 are held in their radially outward or unlocking position against the action of the compression spring 28. I have found that this assembly will remain in the unlocked position until the retaining sleeve is again moved upward by operation of the head 23 shown, or on another and similar collet, as can be appreciated.

From the above description, it can be seen that I have provided a chuck or tool holding device which is considerably simplified, which needs no special wrenches or tools to insert or remove the tools from the machines, and which in actual practice provides the advantages set forth above, namely a reduction in manual operations, a simplicity of adaptor tools, and a means of presetting tools in a multiple spindle unit. And while I have shown only one collet and tool with one spindle, obviously one spindle will accommodate similar collets permitting one collet to be in use while others are being sharpened and reset, thus reducing the time the machine is inoperative, and while I have shown eight balls in sets of two 90° apart, obviously six balls 120° apart, or four balls 180° apart, could be used, or the four, six, or eight balls could be replaced with two, three or four pins rounded at each end to act against the camming surfaces 25 and 37. Also, where herein the various parts of my invention have been referred to as located in a right or left or an upper or lower or an inward or outward position, it will be understood that this is done solely for the purpose of facilitating description and that such references relate only to the relative positions of the parts as shown in the drawings.

Also, it is to be understood that many changes and modifications may be made without departing from the scope or spirit of the invention and the invention is defined and comprehended solely by the appended claims which should be construed as broadly as the prior art will permit.

I claim:

1. A presettable cutting tool holding means comprising a rotatable spindle, a collet for holding a cutting tool, presetting means on said collet for permitting gaging of said tool against a preselected standard, means for receiving said collet in said spindle, locking means in said spindle cooperating with said presetting means for locking said collet against longitudinal movement in said spindle, means on said spindle for releasing said locking means to permit removal of said collet from said spindle, and means in said spindle for holding said releasing means in release position while said collet is removed from said spindle and adapted to be rendered inoperative by presetting means inserted in said spindle.

2. A presettable cutting tool holding means comprising a rotatable spindle, a collet for holding a cutting tool, presetting means on said collet for permitting gaging of said tool against a preselected standard, means for receiving said collet in said spindle, locking means in said spindle cooperating with said presetting means for locking said collet against longitudinal movement in said spindle, means on said presetting means cooperating with sad locking means to prevent backlash of said tool, means on said spindle for releasing said locking means to permit removal of said collet from said spindle, and means in said spindle for holding said releasing means in released position while said collet is removed from said spindle and adapted to be rendered inoperative by presetting means inserted in said spindle.

3. A presettable cutting tool holding means comprising a rotatable spindle, a collet for holding a cutting tool, presetting means comprising a screw threadably received in said collet for permitting gaging of said tool against a preselected standard by changing the position of said screw with respect to said tool, means for receiving said collet in said spindle, locking means in said spindle cooperating with said presetting means for locking said collet in said spindle, means on said spindle for releasing said locking means to permit removal of said collet from said spindle, and means in said spindle for holding said releasing means in release position while said collet is removed from said spindle and adapted to be rendered inoperative by presetting means inserted in said spindle.

4. A presettable cutting tool holding means comprising a rotatable spindle, a collet for holding a cutting tool, presetting means comprising a screw having a head and a shank threadedly engaged with said collet for permitting gaging of said tool against a preselected standard by changing the position of said head with respect to said tool, means for receiving said collet in said spindle, locking means in said spindle cooperating with said presetting means for locking said collet against longitudinal movement in said spindle, said locking means comprising means engaging said head camming means engaged with said head-engaging means, and means biasing said camming means toward engagement with said head, said biasing means being arranged to be overcome by manual operation for releasing the locking means to permit removal of said collet from said spindle, and means in said spindle for holding said biasing means in releasing position while said collet is removed from said spindle and adapted to be rendered inoperative by presetting means inserted in said spindle.

5. A presettable cutting tool holding means comprising a rotatable spindle, a collet for holding a cutting tool, presetting means comprising a screw having a head and a shank threaded in said collet for permitting gaging of said tool against a preselected standard by changing the position of said head with respect to said tool, means for receiving said collet in said spindle, locking means in said spindle cooperating with said presetting means for locking said collet against longitudinal movement in said spindle, said locking means comprising a collar having a camming surface, means engaging said head and engaged by said camming surface, means biasing said collar toward a locking position so that said camming surface urges said head engaging means toward engagement with said head, said collar being movable toward a releasing position by overcoming said biasing means to disengage the locking means from said presetting means to permit removal of said collet from said spindle, and means in said spindle for holding said collar in said releasing position while said collet is removed from said spindle and adapted to be rendered inoperative by presetting means inserted in said spindle.

6. A presettable cutting tool holding means comprising a rotatable spindle, a collet for holding a cutting tool, presetting means comprising a screw having a head and a threaded shank working in said collet for permitting gaging of said tool against a preselected standard by changing the position of said head with respect to said tool, means for receiving said collet in said spindle, locking means in said spindle cooperating with said presetting means for locking said collet against longitudinal movement in said spindle, said locking means comprising a collar having a camming surface, means engaging said head and engaged by said camming surface, means biasing said collar toward a locking position so that said camming surface urges said engaging means toward engagement with said head, said collar being movable toward a release position by overcoming of said biasing means to allow disengagement of the locking means from said presetting means to permit removal of said collet from said spindle, means in said spindle for holding said collar in release position while said collet is removed from said spindle and adapted to be rendered inoperative by presetting means inserted in said spindle, and means on said head to cooperate with said locking means to prevent backlash of a tool in said collet.

7. A presettable cutting tool holding means comprising a rotatable spindle, a collet for holding a cutting tool, presetting means comprising a screw having a head and a threaded shank working in said collet for permitting gaging of said tool against a preselected standard by changing the position of said head with respect to said tool, means for receiving said collet in said spindle, locking means in said spindle cooperating with said presetting means for locking said collet in said spindle, said locking means comprising a collar having a camming surface, means engaging said head and arranged in contact with said surface, means biasing said collar toward a locking position so that said camming surface urges said engaging means toward engagement with said head, said collar being movable toward a releasing position by overcoming said biasing means to release the locking means from engagement with said presetting means to permit removal of said collet from said spindle, and retaining means in said spindle for holding said collar in said releasing position while said collet is removed from said spindle and being adapted to be rendered inoperative by presetting means inserted in said spindle, said retaining means including a spring-biased plunger axially operable by said head, and means on said head to cooperate with said locking means to prevent backlash of a tool in said collet.

8. A presettable cutting tool holding means comprising a rotatable spindle, a collet for holding a cutting tool, presetting means comprising a screw having a head and a threaded shank engaged in said collet for permitting gaging of said tool against a preselected standard by changing the position of said head with respect to said tool, means for receiving said collet in said spindle, locking means in said spindle cooperating with said presetting means for locking said collet in said spindle, said locking means comprising a collar having a camming surface, means shiftable by said camming surface for engaging said head, means biasing said collar toward a locking position so that said camming surface urges said shiftable means toward engagement with said head, said collar being movable toward a release position by overcoming of said biasing means to release the locking means from engagement with said presetting means to permit removal of said collet from said spindle, and means in said spindle for holding said collar in said release position while said collet is removed from said spindle and being adapted to be rendered inoperative by presetting means inserted in said spindle, said holding means comprising a spring biased plunger axially operable by said head.

9. A presettable cutting tool holding means comprising a rotatable spindle, a collet for holding a cutting tool, presetting means comprising a screw having a head and a threaded shank engaged in said collet for permitting gaging of said tool against a preselected standard by changing the position of said head with respect to said tool, means for receiving said collet in said spindle, locking means in said spindle cooperating with said presetting means for locking said collet in said spindle, said locking means including means engaging said head, means biasing said locking means toward a locking position disposing said head-engaging means in engagement with said head, said biasing means being arranged to be manually overcome to release the locking means from engagement with said presetting means to permit removal of said collet from said spindle, means in said spindle for holding said locking means in released position while said collet is removed from said spindle and being adapted to be rendered inoperative by presetting means inserted in said spindle, and means on said head cooperable with said head-engaging means to prevent backlash of a tool in said collet.

10. A presettable cutting tool holding collet for holding a cutting tool with a portion thereof of fixed length received in the collet, presetting means on said collet for permitting gaging of said tool against a preselected standard, said presetting means comprising a screw threadable in one end of said collet to provide adjustment of the length of the screw portion projecting outwardly of said collet, whereby to adjust the distance between the cutting portion of the tool and the outer end of said screw to said standard.

References Cited in the file of this patent

UNITED STATES PATENTS

| | | |
|---|---|---|
| 2,423,551 | Caffin | July 8, 1947 |
| 2,533,758 | Better | Dec. 12, 1950 |
| 2,849,902 | De Vlieg | Sept. 2, 1958 |